(12) United States Patent
Ramberg et al.

(10) Patent No.: US 11,762,989 B2
(45) Date of Patent: *Sep. 19, 2023

(54) SECURING ELECTRONIC DATA BY AUTOMATICALLY DESTROYING MISDIRECTED TRANSMISSIONS

(71) Applicant: Bottomline Technologies (de) Inc., Portsmouth, NH (US)

(72) Inventors: Trevor Ramberg, North Hampton, NH (US); Fred Ramberg, North Hampton, NH (US)

(73) Assignee: Bottomline Technologies Inc., Portsmouth, NH (US)

( * ) Notice: Subject to any disclaimer, the term of this patent is extended or adjusted under 35 U.S.C. 154(b) by 391 days.

This patent is subject to a terminal disclaimer.

(21) Appl. No.: 16/716,445

(22) Filed: Dec. 16, 2019

(65) Prior Publication Data

US 2020/0117800 A1 Apr. 16, 2020

Related U.S. Application Data

(63) Continuation-in-part of application No. 15/170,048, filed on Jun. 1, 2016, now Pat. No. 10,511,605.

(Continued)

(51) Int. Cl.
*H04L 9/00* (2022.01)
*G06F 21/00* (2013.01)
(Continued)

(52) U.S. Cl.
CPC ............ *G06F 21/554* (2013.01); *G06F 21/34* (2013.01); *G06F 21/604* (2013.01);
(Continued)

(58) Field of Classification Search
CPC ...... G06F 21/554; G06F 21/34; G06F 21/604; G06F 21/6245; G06F 2221/2111;
(Continued)

(56) References Cited

U.S. PATENT DOCUMENTS 4,575,793 A 3/1986 Morel et al.
5,228,122 A 7/1993 Cahn et al.
(Continued)

FOREIGN PATENT DOCUMENTS

EP 1211865 A2 6/2002
EP 1706960 A1 10/2006
(Continued)

OTHER PUBLICATIONS

Appaloosa Store, "Siring Similarity Algorithms Compared", Apr. 5, 2018, webpage downloaded on Oct. 20, 2020 rom https://medium.com/@appaloosastore/string-similarity-algorithms-compared-3f7b4d12f0ff.

(Continued)

*Primary Examiner* — Daniel B Potratz
*Assistant Examiner* — Syed M Ahsan
(74) *Attorney, Agent, or Firm* — Richard A. Baker, Jr.

(57) ABSTRACT

A method for securing data by embedding the data in a data structure and utilizing a sensor device to detect transfer of the data structure. The data is embedded such that the data is only accessible by first executing an executable program. If the executable program determines that the device attempting to access the data (the accessing device) does not have permission to access the data, then the executable program destroys all or a portion of the data. If the data structure is transferred to another device, a sensor device positioned to detect the data structure when transferred will identify the data. If the sensor device determines that the data structure is not permitted to be transferred, then the sensor device destroys all or a portion of the data.

20 Claims, 4 Drawing Sheets

Related U.S. Application Data

(60) Provisional application No. 62/171,716, filed on Jun. 5, 2015.

(51) Int. Cl.
*G06F 21/55* (2013.01)
*G06F 21/60* (2013.01)
*G06F 21/62* (2013.01)
*G06F 21/34* (2013.01)

(52) U.S. Cl.
CPC .. *G06F 21/6245* (2013.01); *G06F 2221/2111* (2013.01); *G06F 2221/2141* (2013.01); *G06F 2221/2143* (2013.01)

(58) Field of Classification Search
CPC ..... G06F 2221/2141; G06F 2221/2143; G06F 21/6209
See application file for complete search history.

(56) References Cited

U.S. PATENT DOCUMENTS

| | | |
|---|---|---|
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| 9,231,923 B1* | 1/2016 | Cignetti ............ H04L 63/061 |
| 9,489,627 B2 | 11/2016 | Bala |
| 9,529,678 B2 | 12/2016 | Krelbaum et al. |
| 9,537,848 B2 | 1/2017 | McLaughlin et al. |
| 9,607,103 B2 | 3/2017 | Anderson |
| 9,667,609 B2 | 5/2017 | McLaughlin et al. |
| 9,691,085 B2 | 6/2017 | Scheidelman |
| 10,037,533 B2 | 7/2018 | Caldera |
| 10,152,680 B1 | 12/2018 | Myrick et al. |
| 10,235,356 B2 | 3/2019 | Amend et al. |
| 10,242,258 B2 | 3/2019 | Guo et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,552,837 B2 | 2/2020 | Jia et al. |
| 10,552,841 B2 | 2/2020 | Dixit |
| 10,607,008 B2 | 3/2020 | Byrne et al. |
| 10,607,228 B1 | 3/2020 | Gai et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 11,042,555 B1 | 6/2021 | Kane et al. |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2002/0194159 A1 | 12/2002 | Kamath et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0233305 A1 | 12/2003 | Solomon |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 | 8/2005 | Napier et al. |
| 2005/0228938 A1* | 10/2005 | Khare .................. G06F 21/6245 711/103 |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0180519 A1* | 8/2007 | Boccon-Gibod ... H04L 63/0428 726/21 |
| 2007/0277224 A1 | 11/2007 | Osborn et al. |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0193501 A1* | 7/2009 | Shing .................... G06F 21/32 726/3 |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0169958 A1 | 7/2010 | Werner et al. |
| 2010/0225443 A1 | 9/2010 | Bayram et al. |
| 2011/0055907 A1 | 3/2011 | Narasimhan |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1* | 6/2012 | Burgess .............. G06F 21/6218 726/1 |
| 2012/0198570 A1* | 8/2012 | Joa ...................... G06F 21/6218 726/30 |
| 2012/0255026 A1* | 10/2012 | Baca ..................... H04L 63/08 726/26 |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0339141 A1 | 12/2013 | Stibel et al. |

(56) References Cited

U.S. PATENT DOCUMENTS

| | | | |
|---|---|---|---|
| 2014/0006347 A1 | 1/2014 | Qureshi et al. | |
| 2014/0067656 A1 | 3/2014 | Cohen et al. | |
| 2014/0149130 A1 | 5/2014 | Getchius | |
| 2014/0366159 A1 | 12/2014 | Cohen | |
| 2015/0039473 A1 | 2/2015 | Hu et al. | |
| 2015/0128205 A1* | 5/2015 | Mahaffey | H04L 63/105 726/1 |
| 2015/0220509 A1 | 8/2015 | Karov Zangvil et al. | |
| 2015/0264573 A1 | 9/2015 | Giordano et al. | |
| 2015/0348041 A1 | 12/2015 | Campbell et al. | |
| 2016/0041984 A1 | 2/2016 | Kaneda et al. | |
| 2016/0113047 A1* | 4/2016 | Chen | H04W 76/18 370/329 |
| 2016/0352759 A1* | 12/2016 | Zhai | H04L 63/1416 |
| 2017/0039219 A1 | 2/2017 | Acharya et al. | |
| 2017/0154382 A1 | 6/2017 | McLaughlin et al. | |
| 2017/0163664 A1 | 6/2017 | Nagalla et al. | |
| 2017/0177743 A1 | 6/2017 | Bhattacharjee et al. | |
| 2017/0300911 A1 | 10/2017 | Alnajem | |
| 2018/0107944 A1 | 4/2018 | Lin et al. | |
| 2018/0349924 A1 | 12/2018 | Shah et al. | |
| 2019/0197189 A1 | 6/2019 | Studnicka | |
| 2019/0228411 A1 | 7/2019 | Hernandez-Ellsworth et al. | |
| 2019/0347281 A1 | 11/2019 | Natterer | |
| 2019/0349371 A1 | 11/2019 | Smith et al. | |
| 2019/0373001 A1 | 12/2019 | Deeb et al. | |
| 2020/0019964 A1 | 1/2020 | Miller et al. | |
| 2021/0049326 A1 | 2/2021 | Amend et al. | |

FOREIGN PATENT DOCUMENTS

| | | |
|---|---|---|
| EP | 2653982 A1 | 10/2013 |
| EP | 2636149 A4 | 10/2016 |
| IL | 176551 A | 9/2012 |
| IN | 219405 | 3/2007 |
| KR | 10-0723738 B1 | 5/2007 |
| TW | 201723907 A | 7/2017 |
| WO | 01/25914 A2 | 4/2001 |
| WO | 02/87124 A1 | 10/2002 |
| WO | 2002/100039 A2 | 12/2002 |
| WO | 03/73724 A2 | 9/2003 |
| WO | 2005/067209 A1 | 7/2005 |
| WO | 2012/061701 A1 | 5/2012 |
| WO | 2014/145395 A2 | 9/2014 |
| WO | 2017/096206 A1 | 6/2017 |
| WO | 2017/209799 A1 | 12/2017 |

OTHER PUBLICATIONS

Banon, Shay, "Geo Location and Search", elastic blog post, Aug. 16, 2010, webpage found at https://www.elastic.co/blog/geo-location-and-search on Oct. 15, 2019.

Bansal, Nikhil, Avrim Blum, and Shuchi Chawla. "Correlation clustering." Machine Learning 56.1-3 (2004): 89-113.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Dalit Amitai, Shahar Cohen, Yulia Mayer, and Avital Seraty, "Fraud Detection Rule Optimization", U.S. Appl. No. 16/985,773, filed Aug. 5, 2020.

Experian, "Fuzzy address searching", webpage downloaded from https://www.edq.com/glossary/fuzzy-address-searching/ on Oct. 8, 2019.

Fenz, Dustin, et al, "Efficient Similarity Search in Very Large String Sets", conference paper, Jun. 2012.

Finley, Thomas, and Thorsten Joachims. "Supervised clustering with support vector machines." Proceedings of the 22nd international conference on Machine learning, ACM, 2005.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

International Search Report for corresponding International Application No. PCT/US2016/064689 dated Feb. 22, 2017.

Jeremy Olshan, How my bank tracked me to catch a thief, MarketWatch, Apr. 18, 2015.

Meia et al., Comparing clusterings—an information based distance, Journal of Multivariate Analysis 98 (2007) 873-895.

Mitchell, Stuart, et al., "pulp Documentation", Release 1.4.6, Jan. 27, 2010.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Sorournejad, Zahra Zojaji, Reza Ebrahimi Atani, Amir Hassan Monadjemi, "A Survey of Credit Card Fraud Detection Techniques: Data and Technique Oriented Perspective", 2016.

Schulz, Klaus and Stoyan Mihov, "Fast String Correction with Levenshtein-Automata", IJDAR (2002) 5: 67. https://doi.org/10.1007/s10032-002-0082-8.

The Telnet Protocol Microsoft Knowledgebase; entered into the case on Apr. 18, 2013.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikil Kwak, Yong Shi, John J. Cheh, and Heeseok Lee, "Multiple Criteria Linear Programming Data Mining Approach: An Application for Bankruptcy Prediction", : Data Mining and Knowledge Management, Chinese Academy of Sciences Symposium, 2004, LNAI 3327, pp. 164-173, 2004.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Written Opinion of the International Searching authority for corresponding International Application No. PCT/US2016/064689 dated Feb. 22, 2017.

* cited by examiner

SECURING ELECTRONIC DATA BY AUTOMATICALLY DESTROYING MISDIRECTED TRANSMISSIONS

RELATED APPLICATIONS

This application is a continuation-in-part of U.S. Pat. No. 10,511,605, issued on Dec. 17, 2019, filed on Jun. 1, 2016 as U.S. application Ser. No. 15/170,048. U.S. application Ser. No. 15/170,048 claims the benefit of U.S. Application No. 62/171,716 filed on Jun. 5, 2015. Both of which are herein incorporated by reference in their entirety.

TECHNICAL FIELD

The present invention relates to data security and, more particularly, to a method and system for securing electronic data in a data structure.

BACKGROUND OF THE INVENTION

Electronic data is commonly used to store important information such as healthcare and financial data. As the amount of electronic data has dramatically increased over the past decade, so have the number of data breaches, resulting in billions of private records being stolen. For this reason, much research has gone into improved methods of securing data.

Current methods for protecting data generally utilize sophisticated encryption schemes and/or multi-factor authentication in order to ensure that only authorized users gain access to the data. These current methods "trigger" on "who" is accessing the data and the current methods are typically constructed and deployed as "layers" of security starting potentially as true physical layers at the perimeter and culminating as encrypt/decrypt schemes. The current methods for protecting data generally have the disadvantage of (1) making data hard to get to, (2) making data difficult to utilize without a key, and (3) complicating access for authorized users by breaking data apart, storing the data in pieces at different locations, and distributing assembly instructions to authorized users.

SUMMARY OF THE INVENTION

A new method for protecting data is needed that does not impose additional burdens on users and system administrators.

The present disclosure provides a method for securing data by embedding the data in a data structure such that the data is only accessible by first executing an executable program and by using a sensor device positioned to detect the data structure when transferred, where the executable program and sensor device are configured, respectively, to destroy the data if the data structure is not permitted to be accessed or transferred, from a particular location, as opposed to by a particular entity.

According to one aspect of the disclosure, there is provided a system for securing electronic data. The system includes an executable program stored on a non-transitory computer readable medium of an accessing device and configured to be executed by a processor of the accessing device. The system also includes a data structure stored on a non-transitory computer readable medium of a host device. The data structure comprising an identifier and embedded data accessible only by first executing the executable program. The executable program when executed determines if the accessing device attempting to access the embedded data has permission to access the embedded data. If the accessing device is determined not to have permission to access the embedded data, the executable program destroys all or part of the embedded data. If the accessing device is determined to have permission to access the embedded data, the executable program allows the host device to access the embedded data. The system further includes a sensor device positioned to detect the data structure when transferred from the host device to a receiving device outside of a predefined area. The sensor device is configured to: detect the identifier of the data structure when the data structure is transferred from the host device to a receiving device and access a permission table associating each of a plurality of identifiers with a permission regarding transfer and determine a permission associated with the identifier. If the permission associated with the identifier indicates that the data structure is permitted to be transferred to the receiving device, then the sensor device is configured to allow the data structure to be transmitted to the receiving device. If the permission associated with the identifier indicates that the data structure is not permitted to be transferred to the receiving device, then the sensor device is configured to destroy all or part of the embedded data.

Alternatively or additionally, the executable program is embedded in the data structure. The data structure could include either healthcare or financial data.

Alternatively or additionally, the sensor device destroys the embedded data by setting a flag of the data structure to an armed state and the executable program destroys the embedded data if the flag is set to an armed state.

Alternatively or additionally, the sensor device allows the data structure to be transmitted to the receiving device by setting the flag of the data structure to a disarmed state and the executable program allows the embedded data to be accessed if the flag is set to the disarmed state.

Alternatively or additionally, the flag is set by default to the armed state.

Alternatively or additionally, the flag is set by default to the disarmed state.

Alternatively or additionally, the executable program determines if the accessing device has permission to access the embedded data by: determining at least one of an identity or a location of the accessing device attempting to access the embedded data and determining a permission associated with the identifier. If the permission associated with the identifier indicates that the data structure is permitted to be accessed by the accessing device, then the executable program allows the embedded data to be accessed. If the permission associated with the identifier indicates that the data structure is not permitted to be accessed by the accessing device, then the executable program destroys all or part of the embedded data.

Alternatively or additionally, the executable program determines the permission associated with the identifier by: connecting to a predetermined server and accessing a permission table stored on the predetermined server. The permission table associates each of a plurality of identifiers with a permission regarding access.

Alternatively or additionally, when the executable program is executed by the accessing device and the executable program determines that the accessing device does not have permission to access the embedded data, then the executable program determines an identity of the accessing device and transfers the identity of the accessing device to a predetermined server.

Alternatively or additionally, the embedded data is destroyed by setting each bit of the embedded data to zero or one.

Alternatively or additionally, the embedded data is destroyed by overwriting each bit of the embedded data with random data.

Alternatively or additionally, the embedded data is destroyed by first setting each bit of the embedded data to zero or one and then overwriting each bit of the embedded data with random data.

Alternatively or additionally, the system further includes a network for transferring the data structure between the host device and the receiving device.

Alternatively or additionally, the sensor device comprises a packet analyzer, a network switch, a network router, or a network sniffer.

Alternatively or additionally, the network comprises at least one of a TCP/IP network or a system bus.

Alternatively or additionally, the predefined area is a local area network.

According to another aspect of the disclosure, there is provided a data structure stored on a non-transitory computer readable medium of a host device and configured to secure electronic data. The data structure includes an identifier and embedded data accessible only by first executing an executable program. The executable program when executed determines if an accessing device attempting to access the embedded data has permission to access the embedded data. If the accessing device is determined not to have permission to access the embedded data, the executable program destroys all or a portion of the embedded data. If the accessing device is determined to have permission to access the embedded data, the executable program allows the accessing device to access the embedded data.

Alternatively or additionally, the executable program is embedded in the data structure.

Alternatively or additionally, the executable program is configured to determine if the accessing device has permission to access the embedded data by: determining at least one of an identity or a location of the accessing device attempting to access the embedded data and determining a permission associated with the identifier. If the permission associated with the identifier indicates that the data structure is permitted to be accessed by the accessing device, then the executable program is configured to allow the embedded data to be accessed. If the permission associated with the identifier indicates that the data structure is not permitted to be accessed by the accessing device, then the executable program is configured to destroy all or a portion of the embedded data.

Alternatively or additionally, the executable program determines the permission associated with the identifier by: connecting to a predetermined server and accessing a permission table stored on the predetermined server. The permission table associates each of a plurality of identifiers with a permission regarding access.

According to a further aspect of the disclosure, there is provided a method for securing electronic data. The method includes embedding data to be secured in a data structure such that the embedded data is not accessible without first executing an executable program. The data structure is stored in a non-transitory computer readable medium of a host device. The method also includes determining if an accessing device has permission to access the embedded data. If the accessing device is determined not to have permission to access the embedded data, the method destroys all or a portion of the embedded data. If the accessing device is determined to have permission to access the embedded data, the method allows the accessing device to access the embedded data. The method additionally includes transferring the data structure to a receiving device and, during transfer of the data structure, detecting an identifier of the data structure using a sensor device. The method further includes accessing a permission table associating each of a plurality of identifiers with a permission regarding transfer and determining a permission associated with the identifier. If the permission associated with the identifier indicates that the data structure is permitted to be transferred to the receiving device, the method allows the data structure to be transmitted to the receiving device. If the permission associated with the identifier indicates that the data structure is not permitted to be transferred to the receiving device, the method includes destroying all or a portion of the embedded data.

A number of features are described herein with respect to embodiments of this disclosure. Features described with respect to a given embodiment also may be employed in connection with other embodiments.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

DETAILED DESCRIPTION OF THE INVENTION

Figure 3:
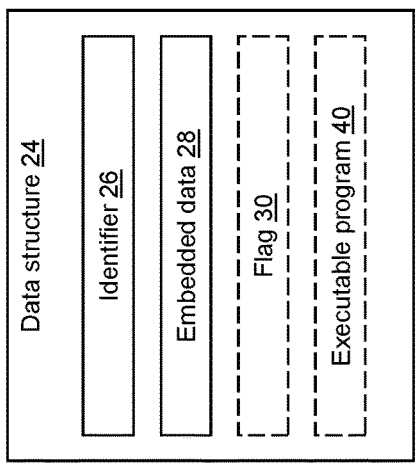
FIG. 3 is a block diagram of one embodiment of a data structure.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present disclosure provides a method for securing data by embedding the data in a data structure and utilizing a sensor device to detect transfer of the data structure. The data is embedded such that the data is only accessible by first executing an executable program. If the executable program determines that the device attempting to access the data (the accessing device) does not have permission to access the data, then the executable program destroys the data. If the data structure is transferred to another device, a sensor device positioned to detect the data structure when transferred will identify the data. If the sensor device determines that the data structure is not permitted to be transferred, then the sensor device destroys the data.

Figure 1:
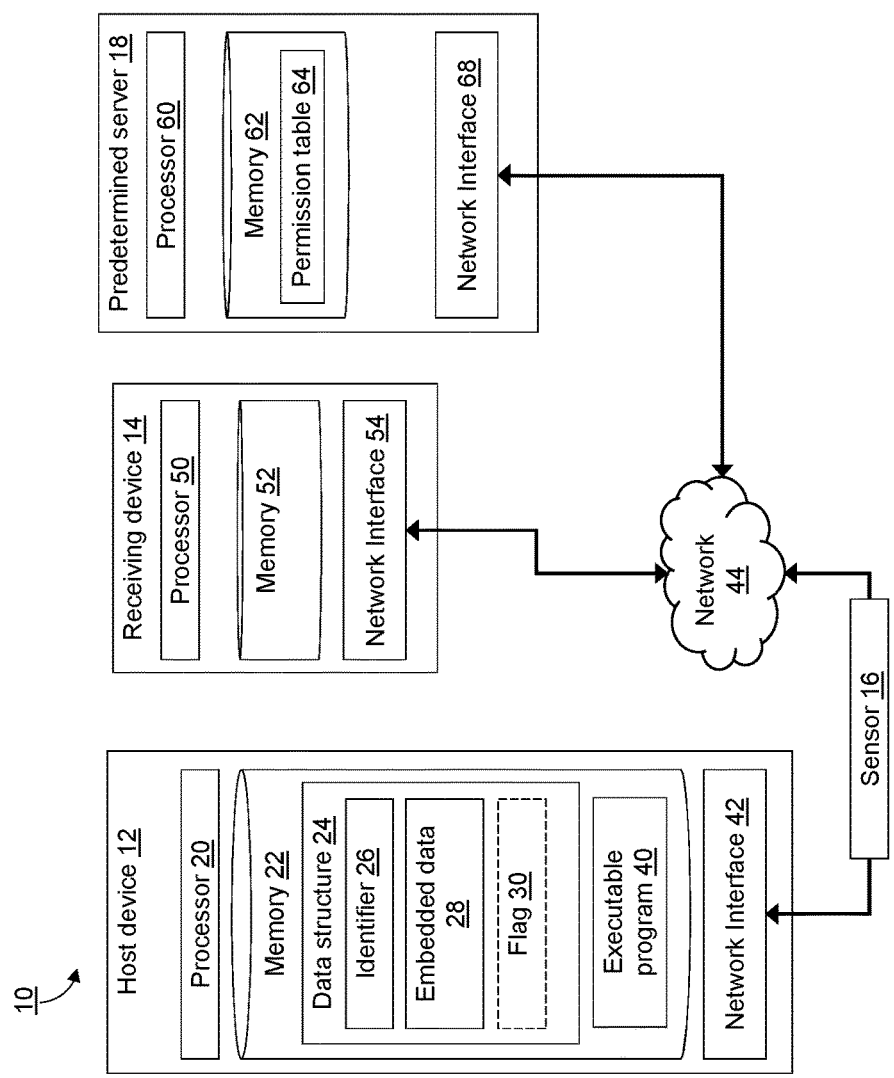
FIG. 1 is a block diagram representing a system for protecting electronic data utilizing a data structure.

FIG. 1 depicts a system 10 for securing electronic data. The system 10 includes a host device 12 and a sensor device 16. The system 10 may also include a receiving device 14 and a predetermined server 18. The host device 12 includes a memory 22 storing a data structure 24 and an executable program 40. The executable program 40 is executed by a processor 20 of the host device 12. The data structure 24 includes an identifier 26 and embedded data 28. The host device 12 may additionally include a network interface 42 for transferring the data structure 24 to the receiving device 14 via a network 44.

If a user of the host device 12 attempts to access the data structure 24, the executable program 40 is executed before the host device 12 is provided access to the embedded data 28. In this way, a user is unable to access the embedded data 28 prior to the executable program 40 determining whether the user has permission to access the data. If the user does not have permission to access the embedded data 28, then the embedded data 28 is destroyed.

As shown in FIG. 1, the sensor device 16 is positioned to detect the data structure 24 when transferred to the receiving device 14. When the data structure 24 is transferred from the host device 12 to the receiving device 14, the sensor device 16 detects the identifier 26 of the data structure 24. The sensor device 16, then determines if the data structure 24 is permitted to be transferred to the receiving device 14. If the data structure 24 is not permitted to be transferred to the receiving device 14, then the embedded data 28 is destroyed.

The predetermined server 18 may be a computer system of one or more servers. The host device 12 and/or receiving device 14 may comprise a cellular phone, smart phone, tablet, mobile computer, desktop computer, laptop, or any other suitable computer apparatus capable of executing the executable program 40 and sending or receiving a data structure 24. The host device 12, receiving device 14, and predetermined server 18 each include at least a processor, a network interface, and non-transitory computer readable medium. The computer readable medium may include encoded thereon instructions for interfacing with the corresponding network interface and reading and writing data to the corresponding computer readable medium. The computer readable medium may also include computer programs comprising instructions embodied thereon that are executed by the corresponding processor.

Figure 2:
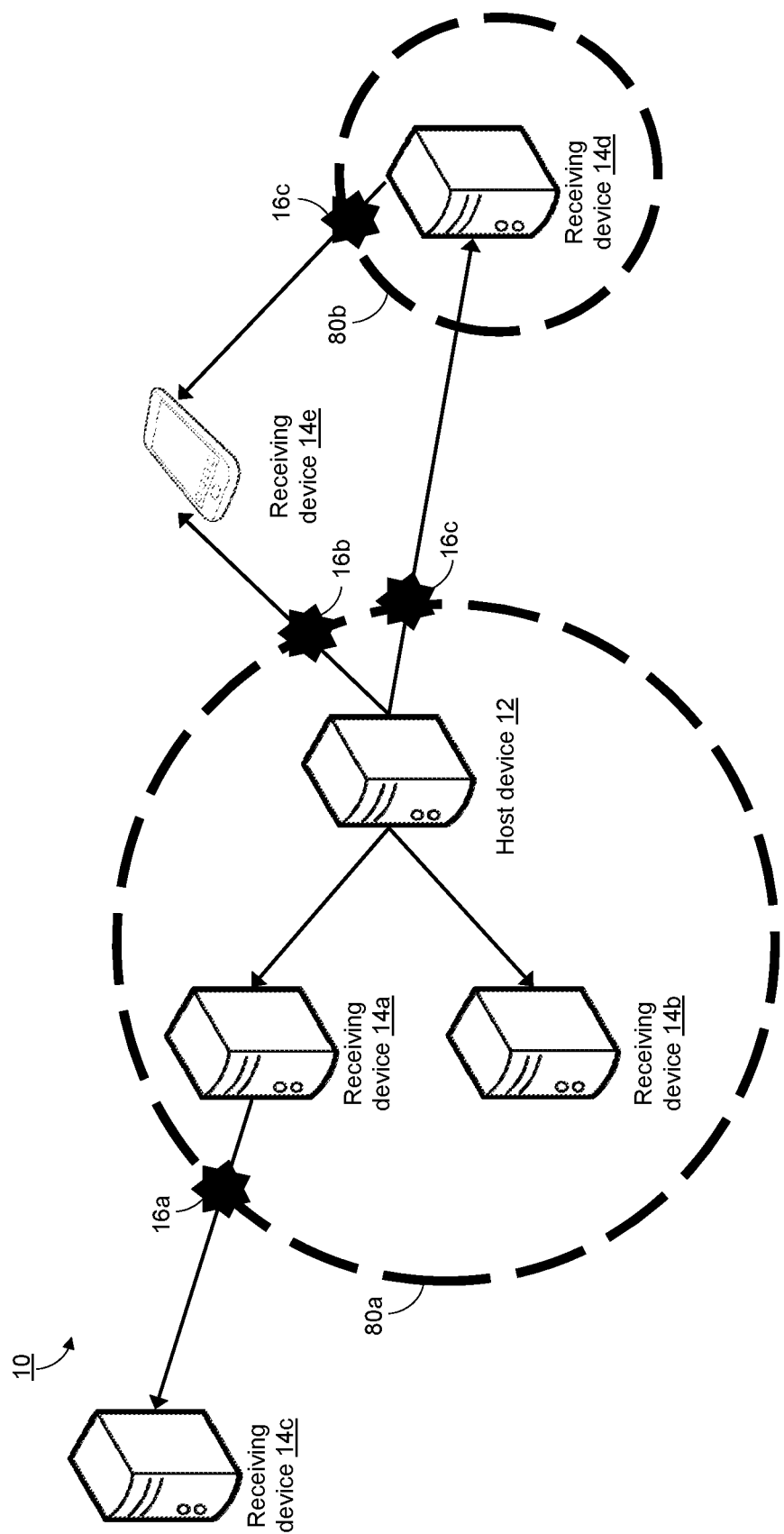
FIG. 2 is a diagram illustrating the protection of data within the system of FIG. 1.

FIG. 2 depicts communication of data between a host device 12 and multiple receiving devices 14a-e. In the figure, two predefined areas 80a, 80b are shown. In this example, the predefined areas 80a, 80b comprise a local area network (LAN). When the host device 12 transfers the data structure 24 to either of the two receiving devices 14a, 14b located within the LAN 80a, the data structure 24 does not pass in front of a sensor device 16. Rather, the data structure 24 is simply passed to the receiving devices 14a, 14b. However, when the data structure 24 is passed outside of the LAN 80a, the data structure 24 passes by the sensor device 16 and is detected. The sensor device 16 then determines whether the data structure 24 has permission to be transmitted to the intended receiving device 14c-e and either destroys the embedded data 28 or allows the data structure 24 to be transmitted to the receiving device 14c-e.

In some embodiments, the sensor device 16 could be a network packet analyzer or network sniffer, attached to the physical network (or watching the wireless network) that monitors the packets on the network, analyzes the contents of the packets to see if the data structure 24 is being transmitted across the network. The sensor device 16 then determines where the data structure 24 is going and whether the data structure 24 has permission to be transmitted to the intended receiving device 14c-e. If the sensor device 16 determines that the data structure 24 is going to a destination that is not permitted, the sensor device could destroy the packets on the network by transmitting noise on the network to destroy the packets. Then the sensor device 16 could transmit valid packets with different data to destroy the data structure (perhaps all ones or all zeros in the applications data portion of the packet). In some embodiments, this function could be performed on a network switch or router.

In some embodiments, the sensor device 16 determines where the data structure 24 is allowed to go based on various lists of organizational data. For instance, only receiving devices 14a-c within an enterprise network are allowed to receive the data. Or perhaps only devices 14a-c assigned to certain organizational functions are allowed to receive the data structure 24. For example, only devices 14a-c assigned to the human resources department are allowed to receive data structures from the personnel database. Any type of organizational restrictions, either vertical, horizontal or other could be implemented without diverting from these inventions.

In another embodiment, the sensor device 16 could be equipped with blacklists or whitelists of employees, organizations, IP addresses, MAC addresses, other network addresses, geographic locations, types of organizations, etc. For instance, all destinations associated with a .ir top level code (Iran) may be prohibited from receiving data structures 24 originating in the USA. Or a whitelist could be maintain for all people who have signed a non-disclosure agreement, allowing them to receive the data structure 24 but prohibiting all others.

As will be understood by one of ordinary skill in the art, the predefined areas 80a, 80b are not limited to a single LAN, but may comprise any suitable network of devices. For example, the predefined areas 80a, 80b may comprise a collection of LANs, a Bluetooth Network, etc.

With further reference to FIG. 2, the data structure 24 may be transferred from one LAN 80a to another LAN 80b. In this example, the host device 12 transfers the data structure 24 to the receiving device 14d located within another LAN 80b. The data structure 24 passes in front of a sensor device 16c when exiting the LAN 80a before reaching the receiving device 14d. Then, when receiving device 14d transmits the data structure 24 to the receiving device 14e located outside of the LAN 80b, the data structure 24 again passes in front of a sensor device 16c.

As will be understood by one of ordinary skill in the art, the transmission of a data structure 24 may be transmitted using any suitable protocol (e.g., TCP/IP, Bluetooth, SMTP, HTTP, SSL, PPP, IMAP, or any other suitable network protocol).

Turning back to FIG. 1, the data structure 24 is stored on a non-transitory computer readable medium 22 of the host device 12. The data structure 24 includes an identifier 26. The identifier 26 may be a value or key stored within the data structure 24. Alternatively, the identifier 26 may instead be determined from the data structure 24. That is, the identifier 26 may not be a value or key stored within the data structure 24, but may instead be determined from properties of the data structure 24. For example, in this example, the identifier 26 may be determined from the bits representing the data structure 24, the overall size of the data structure 24, from accessible data stored within the data structure 24, and/or using any suitable manner for identifying electronic data.

As described above, the embedded data 28 is accessible only by first executing an executable program 40. The executable program 40, when executed, determines if an accessing device attempting to access the embedded data 28 has permission to access the embedded data 28. The executable program 40 may determine if the accessing device has permission to access the embedded data 28 by determining at least one of an identity or a location of the accessing device attempting to access the embedded data and by determining a permission associated with the identifier 26. For example, the executable program 40 may determine the permission associated with a given data structure 24 based on the identifier 26 of the data structure 24. The executable program 40 may determine the permission by connecting to a predetermined server 18 and accessing a permission table 64 stored on the predetermined server 18. The permission table 64 associates each of a plurality of identifiers with a permission regarding access. In this example, the executable 40 may locate the identifier 26 of the data structure 24 within the permission table 64. The permission associated with the identifier 26 may specify a list of approved devices that are approved to access the embedded data 28 within a given location. In this example, the listed approved devices would not have permission if located outside the given location.

The processor of the host device 12 and/or receiving device 14 may identify the location of the corresponding device using a global positioning system (GPS) device, cellular triangulation, WI-FI positioning, or any other suitable technique or device to determine location.

Accessing device refers to any device attempting to access the data structure 24. For example, the accessing device may be the host device 12 and/or the receiving device 14.

As shown in FIG. 3, the executable program 40 may be embedded in the data structure 24. Alternatively, the executable program 40 may be external to the data structure 24, for instance code stored in a network switch, a network router, a network packet analyzer, a network sniffer, or similar device. Even when not embedded in the data structure 24, the embedded data 28 is only accessible by first executing the executable program 40. In both examples (embedded and external), the executable program 40 may be initiated and executed when a user attempts to access the embedded data 28. Alternatively, in both examples (embedded and external), the executable program 40 may be run as a background process that is kept running even when a user is not accessing or attempting to access a data structure 24. In one embodiment, a check is performed when a user attempts to access a data structure 24 to determine if the executable program 40 is currently running and, if it is determined that the executable program 40 is not running, the executable program 40 is initiated and executed.

If the accessing device is determined to have permission to access the embedded data 28, then the executable program 40 allows the accessing device to access the embedded data 28. As described above, the permission may be determined using the permission table 64. In this example, if the permission associated with the identifier 26 indicates that the data structure 24 is permitted to be accessed by the accessing device, then the executable program 40 is configured to allow the embedded data 28 to be accessed. Accessing the embedded data 28 may comprise allowing the embedded data 28 to be loaded into a program.

Conversely, if the accessing device is determined not to have permission to access the embedded data 28, the executable program 40 destroys the embedded data 28. As described above, the permission may be determined using the permission table 64. In this example, if the permission associated with the identifier 26 indicates that the data structure 24 is not permitted to be accessed by the accessing device, then the executable program 40 is configured to destroy the embedded data.

The executable program 40 may destroy the embedded data 28 by setting each bit of the embedded data 28 to zero or one or by overwriting each bit of the embedded data 28 with random data. The executable program 40 may decide between setting each bit of the embedded data 28 to zero or one or overwriting each bit with random data based on time constraints. For example, it is more difficult to recover data overwritten with random data than it is to recover data overwritten with either zeroes or ones. For this reason, it is preferable to overwrite the embedded data 28 with random data. However, it is more time consuming to overwrite with random data. Depending on the timing involved, a malicious user may stop the overwriting with random data before the embedded data 28 is destroyed, allowing the malicious user to recover the embedded data 28 that was not yet overwritten. For this reason, the embedded data 28 may be destroyed by first setting each bit of the embedded data to zero (or one) and then overwriting each bit of the embedded data with random data. In this way, the embedded data 28 is first overwritten quickly and then the embedded data 28 is more thoroughly overwritten. In this example, if a malicious user interrupts the overwriting with random data, then the data has still been overwritten with zeroes or ones.

In some embodiments, the data destruction could be limited to certain fields of the data structure 24, but also allowing other portions of the data structure 24 to be transmitted. For instance, certain countries have laws prohibiting certain information to be transmitted across national borders. With a limited data destruction function, the sensor device 16 may only allow fields that contain personal identifiable information or sensitive data for other reasons to be scrubbed, allowing everything else to be delivered. This would be useful for not only data security from external threats but also be a benefit in using data within an enterprise. For example, limited data destruction allows scrubbing of personal identifying information so that machine learning models can be fed data without the intervention of security each time, as the data is already cleaned of all data marked as restricted by the sensor device 16.

When the executable program 40 is executed by the accessing device and the executable program 40 determines that the accessing device does not have permission to access the embedded data, then the executable program 40 may determine an identity of the accessing device. After determining the identity of the accessing device, the executable program 40 may transfer the identity of the accessing device to a predetermined server 18. The executable program 40 may additionally transfer the identifier 26 of the data structure 24 to the predetermined server 18. In this way, the predetermined server 18 may be informed when a data structure 24 is acquired by an unauthorized device, as well as what data structure 24 has been acquired by the unauthorized device. The predetermined server 18 may then add the unauthorized device to a black list of known unauthorized devices. If the unauthorized device is a device that is permitted to access some data structures 24, then this access may be revoked.

Depending on the information passed to the predetermined server 18 by the executable program 40, the predetermined server 18 may pass the location of the unauthorized device to the authorities, revoke access privileges of the host device 12 that provided the data structure 24 to the unauthorized device, or perform any other suitable actions. In this way, the data structure 24 can be used to not only prevent unauthorized access to embedded data 28, but also to determine the device and/or user attempting to access the data structure 24 without authorization and/or determine the source of leaks of data to unauthorized users/devices.

As described above, the system 10 may additionally include one or more sensors device 16. Each sensor device is positioned to detect the data structure 24 when transferred from the host device 12 to a receiving device outside of a predefined area 80*a*, 80*b*. For example, the sensor device 16 may comprise a separate device from the host device 12 or a component of the host device 12. In one example the sensor device 16 is a packet analyzer or other computer device attached to the network 44 (i.e., the network the host device 12 is attached to) and configured to analyze traffic passing through the network 44. In another example, the sensor device 16 may comprise software, hardware, or a combination thereof located within the host device 12. For example, the sensor device 16 may comprise a program executed by the processor 20 of the host device 12 that is configured to monitor output ports (e.g., USB, Ethernet, Bluetooth, WIFI, serial, parallel, etc.).

The sensor device 16 is configured to detect the identifier 26 of the data structure 24 when the data structure 24 is transferred from the host device 12 to a receiving device 14. When the sensor device 16 is located outside of the host device 12, the detection by the sensor device 16 may be performed after the data structure 24 has been transmitted by the host device 12. Alternatively, when the sensor device 16 is a component of the host device 12, the detection by the sensor device 16 may be performed before the data structure 24 has left the host device 12. For example, when the sensor device 16 comprises a program executed by the processor 20 of the host device 12, the sensor device 16 may detect that a user of the host device 12 is attempting to email the data structure 24 to a receiving device 14.

The data structure 24 may be transferred over a network 44 connecting the host device 12 and the receiving device 14. The network 44 may be at least one of a TCP/IP network or a system bus. For example, when a user attempts to transfer a data structure 24 via a USB port, the network 44 would comprise the system bus connecting the USB port and the memory 22 of the host device 12.

After the sensor device 16 detects the identifier 26 of a data structure 24 being transferred, the sensor device 16 accesses a permission table 64 associating each of a plurality of identifiers with a permission regarding transfer. Using the permission table 64, the sensor device 16 determines a permission associated with the detected identifier 26. For example, the permission table 64 may specify for a given identifier that the associated data structure 24 is permitted to be transferred to a list of authorized devices.

If the permission associated with the detected identifier indicates 26 that the data structure 24 is permitted to be transferred to the receiving device 14, then the sensor device 16 is configured to allow the data structure 24 to be transmitted to the receiving device 14. The sensor device 16 may allow the data structure 24 to be transmitted to the receiving device 14 by setting a flag 30 of the data structure 24 to a disarmed state. When an accessing device attempts to access a data structure 24 with a flag 30 in the disarmed state, the executable program 40 is configured to allow the embedded data 28 to be accessed if the accessing device is determined to have permission to access the data structure 24. Alternatively, the sensor device 16 may allow the data structure 24 to be transmitted to the receiving device 14 by simply not interfering with the transmission (i.e., allowing the transmission to proceed).

If the permission associated with the identifier 26 indicates that the data structure 24 is not permitted to be transferred to the receiving device 14, then the sensor 16 is configured to destroy all or part of the embedded data.

The sensor device 16 may be configured to destroy the embedded data 28 by setting a flag 30 of the data structure 24 to an armed state. When an accessing device attempts to access a data structure 24 with a flag 30 in the armed state, the executable program 40 destroys the embedded data 28. The executable program 40 may be configured to destroy embedded data 28 having a flag 30 in an armed state independent of whether the accessing device is determined to have permission to access the embedded data 28. Alternatively, the executable program 40 may first determine if the accessing device has permission to access the embedded data 28 and destroy the embedded data 28 only if the accessing device does not have permission to access the embedded data 28.

Depending on the security level associated with a given data structure 24, the flag 30 may be set by default to armed, disarmed, or an undefined (e.g., NULL) state. If the flag 30 is set by default to armed and a user is able to transfer the data structure 24 to an accessing device without the data structure 24 being detected by the sensor device 16, then the data structure 24 will destroyed by the executable program 40 when the accessing device attempts to access the data structure 24. The data structure 24 would be destroyed in this example, because the flag 30 would be set to armed and the executable program may be configured to destroy the embedded data 28 when the flag is set to armed. In this example, if the data structure 24 was transferred to an authorized receiving device 14 in front of a sensor 16, then the flag would have been changed to disarmed.

Alternatively, the sensor device 16 may be configured to destroy the embedded data 28 itself by setting each bit of the embedded data 28 to zero or one or by overwriting each bit of the embedded data 28 with random data. That is, in this embodiment, the embedded data 28 has been destroyed before the data structure 24 reaches the receiving device. When the sensor device 16 is a component of the host device 12, the embedded data 28 may be destroyed by the processor 20 of the host device 12. Alternatively, the embedded data 28 may be destroyed by removing it from the data structure 24 such that the data structure 24 received by the receiving device 14 does not contain any representation (e.g., replaced with zeroes, ones, or random data) of the embedded data 28. When the sensor device 16 is separate from the host device 12, the sensor device 16 may include a processor (not shown) that destroys the embedded data 28 before allowing the data structure 24 to continue to the receiving device 14. This embodiment may have improved security, because the embedded data 24 has already been destroyed before it reaches the receiving device 14 and, for this reason, there is less likelihood that a malicious user will be able to obtain the embedded data 24.

In another example, the sensor device 16 may prevent the data structure 24 from reaching the receiving device 14. That is, the sensor device 16 may detect the attempted transmission of the data structure 24 from the host device 12 to the receiving device 14 and terminate the transmission. When the sensor device 16 is a component of the host device 12, the processor 20 of the host device 12 prevents the data structure 24 from being transmitted by instructing the network interface 42 not to transmit the data structure 24. When the sensor 16 is separate from the host device 12, the sensor device 16 may include a processor (not shown) that reroutes the data structure 24 such that the data structure 24 does not reach the receiving device 14. In one example, the sensor 16 reroutes the data structure 24 by simply deleting the data structure 24.

Figure 4A:
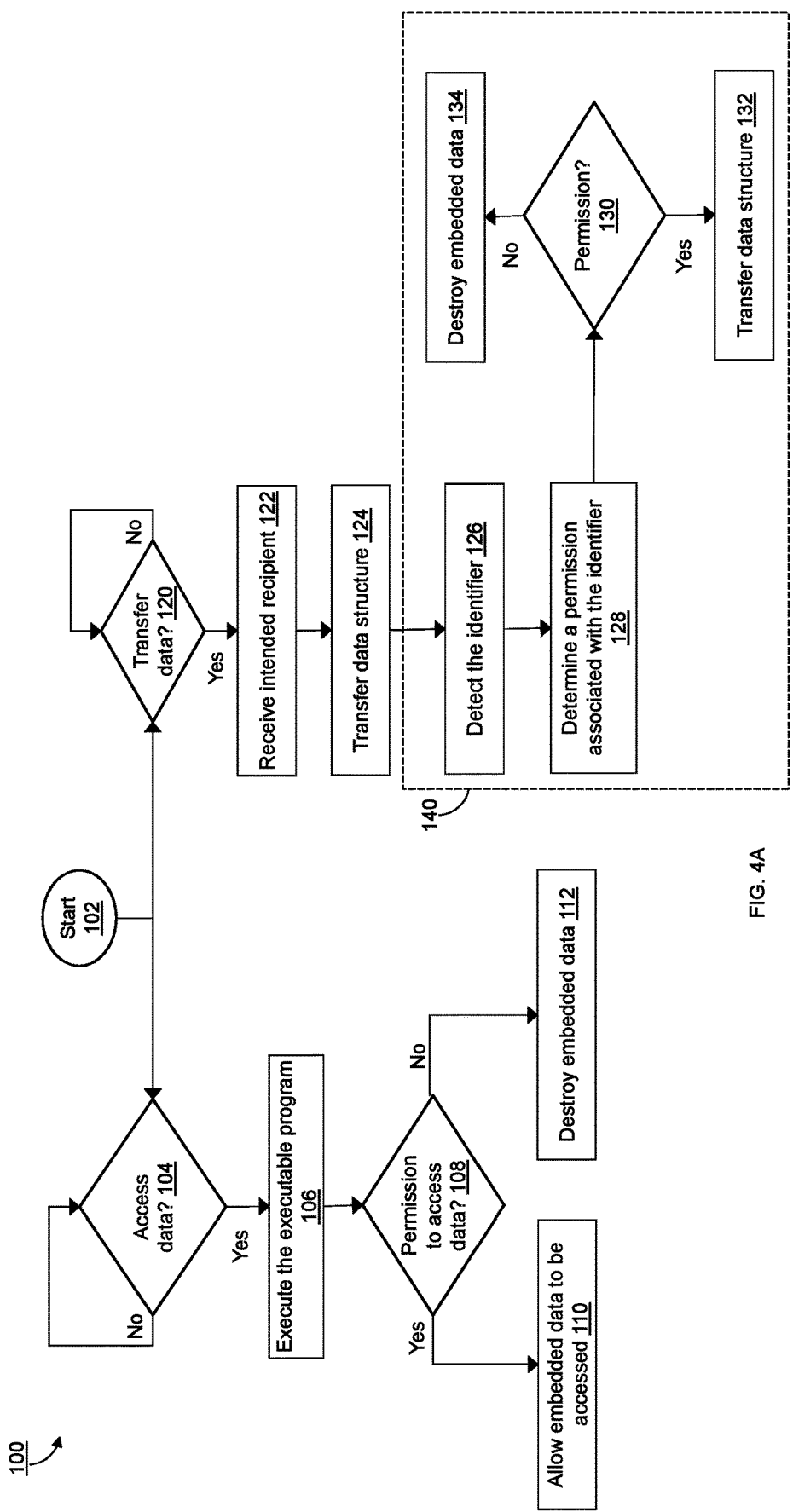
FIG. 4A is flow diagram representing a method for protecting electronic data when an executable program is executed when the data is accessed.

Turning to FIG. 4A, a block diagram is shown depicting a method 100 for securing electronic data when an executable program 40 is executed when the data is accessed. The portion of the method 100 contained within the dashed box 140 may be performed by the sensor device 16 and the remainder of the method 100 may be performed by the host device 12 (e.g., the processor 20 of the host device 12).

Prior to beginning the method in process block 102, the electronic data to be secured is embedded in a data structure 24 such that the embedded data 28 is not accessible without first executing the executable program 40. The data structure 24 is stored in a non-transitory computer readable medium 22 of a host device 12.

Following the start of the method 100 in process block 102, the method 100 splits into two separate paths. The first path, beginning with decision block 104, concerns accessing the embedded data 28 stored within the data structure 24. The second path, beginning with decision block 120, concerns transferring the data structure 24 to a receiving device 14. The two paths may be performed simultaneously.

In decision block 104, the method determines if an accessing device is attempting to access the data structure 24. If the accessing device is not attempting to access the data structure 24, then processing returns to decision block 104. However, if the accessing device is attempting to access the data structure 24, then the method continues onto process block 106. In process block 106, the executable program 40 is executed.

In decision block 108, the executable program 40 determines if the accessing device 12 has permission to access the embedded data 28. If the accessing device is determined to have permission to access the embedded data, the accessing device is allowed 110 to access the embedded data 28. If the accessing device is determined not to have permission to access the embedded data in decision block 108, then the embedded data 28 is destroyed (completely or in part) in process block 112.

In decision block 120, the method determines if the host device 12 is attempting to transfer the data structure 24. If the host device 12 is not attempting to transfer the data structure 24, then processing returns to decision block 120. However, if the host device 12 is attempting to transfer the data structure 24, then the method 100 continues onto process block 122. In process block 122, the intended recipient of the data structure 24 is determined (e.g., received). In process block 124, the host device 12 transfers the data structure 24 to a receiving device 14 (i.e., the intended recipient).

In process block 126, during transfer of the data structure 24, the identifier 26 of the data structure 24 is detected by the sensor device 16, 16a, 16b, 16c. In process block 128, a permission associated with the identifier 26 is determined. As described above, the permission may be determined by accessing a permission table associating each of a plurality of identifiers with a permission regarding transfer.

In decision block 130, it is determined whether the receiving device 14 has permission to receive the data structure 24 and/or whether the host device 12 has permission to transfer the data structure 24. If the permission associated with the identifier 26 indicates that the data structure 24 is permitted to be transferred to the receiving device 14, then the data structure is allowed to be transmitted to the receiving device 14 in process block 132. However, if the permission associated with the identifier 26 indicates that the data structure 24 is not permitted to be transferred to the receiving device 14, then the embedded data 28 is destroyed (all or in part) in process block 134.

Figure 4B:
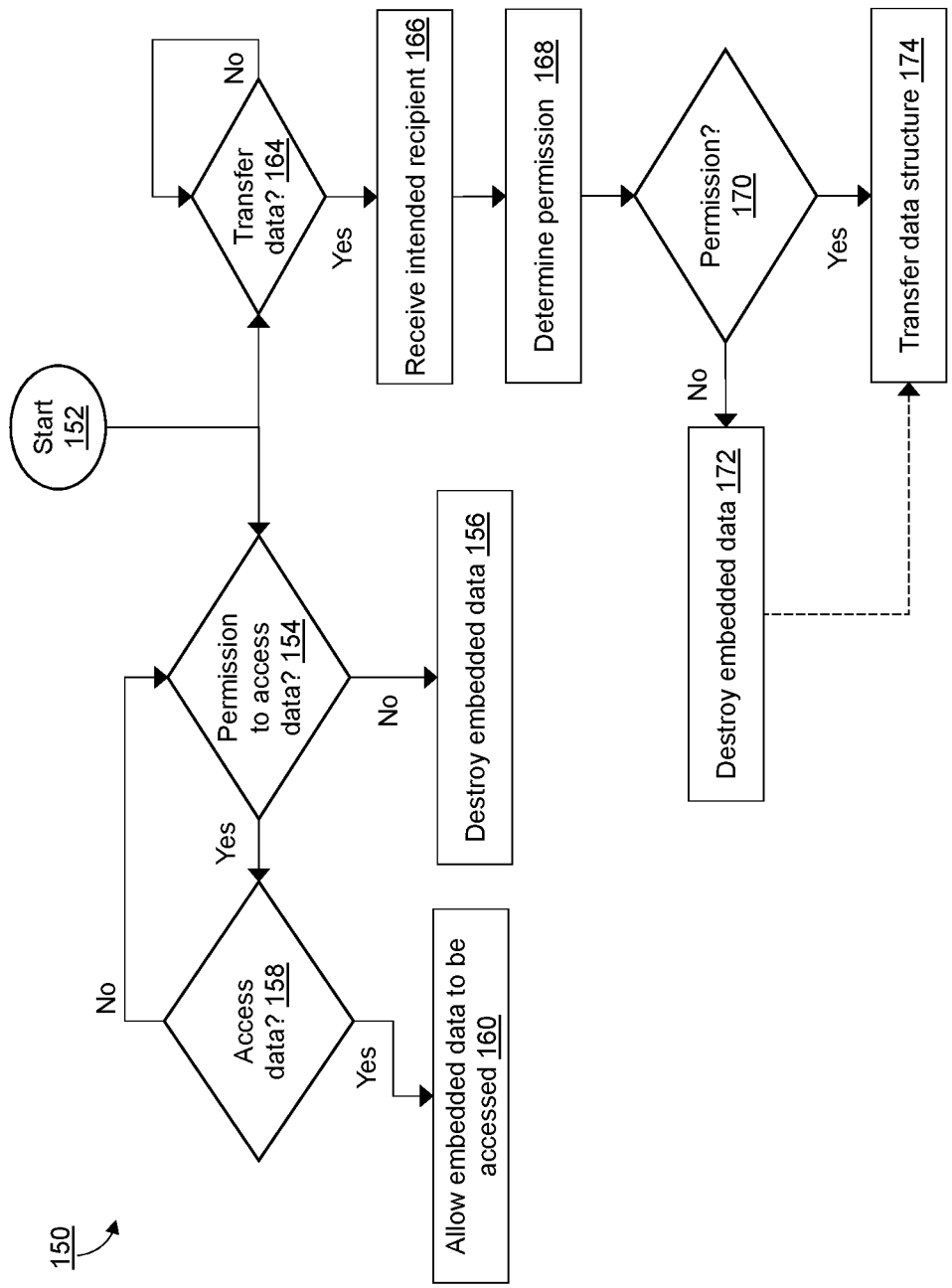
FIG. 4B is flow diagram representing a method for protecting electronic data when an executable program is running as a background process.

Turning to FIG. 4B, a block diagram is shown depicting a method 150 for protecting electronic data when an executable program 40 is running as a background process. As in FIG. 4A, following beginning the method 150 in process block 152, the method 150 splits into two separate paths. The first path, beginning with decision block 154, concerns accessing the embedded data 28 stored within the data structure 24. The second path, beginning with decision block 164, concerns transferring the data structure 24 to a receiving device 14. The two paths may be performed simultaneously.

In decision block 154, the executable program 40 determines if the host device 12 (where the data structure 24 is stored) has permission to access the data structure 24. If the host device 12 does not have permission, then the embedded data 28 is destroyed in process block 156.

In this embodiment of the method 150, the executable program 40 is running as a background process. In one example, permission to access the data structure 24 is dependent on the location of the host device 12. For example, the host device 12 may be an employee's laptop that has permission to access a given data structure 24 while the laptop is located within the LAN of a company. But, the laptop does not have permission to access the data structure 24 when the laptop is located outside the LAN of the company (e.g., at home). In this example, the executable program 40 monitors the location of the host device 12 and, when the executable program 40 detects that the host device 12 has left the LAN of the company, the executable program 40 destroys, in all or in part, the embedded data 28. For example, if the employee downloads the data structure 24 to her laptop within the LAN of the company, the employee will be permitted to access the embedded data 28. If at the end of the day the employee takes her laptop home and attempts to access the data at home, she will find that the embedded data 28 has been destroyed. The data will be destroyed, because the method will detect in decision block 154 that the laptop no longer has permission to access the data structure 24 and the embedded data 28 will be destroyed.

If the host device 12 has permission to access the data structure 154, then processing moves to decision block 158. In decision block 158, the executable program 40 determines whether the host device 12 is attempting to access the embedded data 28. If the host device 12 is not attempting to access the embedded data 28, then processing returns to decision block 154. However, if the host device 12 is attempting to access the data, then the executable program 40 allows the embedded data 28 to be accessed in process block 160.

In decision block 164, the executable program 40 determines if the host device 12 is attempting to transfer the data structure 24. If the host device 12 is not attempting to transfer the data structure 24, then processing returns to decision block 164. If the host device 12 is attempting to transfer the data structure 24, then the intended recipient is received in process block 166. In process block 168, a permission associated with the data structure 24 is determined. As described above, the permission may be determined based on an identifier 26 of the data structure 24.

In decision block 170, it is determined whether the receiving device 14 has permission to receive the data structure 24 and/or the host device 12 has permission to transfer the data structure 24. If the permission associated with the data structure 24 indicates that the data structure 24 is permitted to be transferred to the receiving device 14, then the data structure 24 is allowed to be transmitted to the receiving device 14 in process block 174. However, if the permission associated with the data structure 24 indicates that the data structure 24 is not permitted to be transferred to the receiving device 14, then the embedded data 28 is destroyed (all or in part) in process block 172. Optionally, after destroying the embedded data 28, the data structure 24 (including the destroyed embedded data 28) may be transferred to the receiving device 14 in process block 174.

As will be understood by one of ordinary skill in the art, the processors 20, 50, 60 of the host device 12, receiving device 14, and predetermined server 18 may have various implementations. For example, each of the processors 20, 50, 60 may include any suitable device, such as a programmable circuit, integrated circuit, memory and I/O circuits, an application specific integrated circuit, microcontroller, complex programmable logic device, other programmable circuits, or the like. Each of the processors 20, 50, 60 may also include a non-transitory computer readable medium, such as a random access memory (RAM), a read-only memory (ROM), an erasable programmable read-only memory (EPROM or Flash memory), or any other suitable medium. Instructions for performing the methods described above may be stored in the non-transitory computer readable medium and executed by the respective processor 20, 50, 60 identified in the description of the method. Each of the processors 20, 50, 60 may be communicatively coupled to the respective computer readable medium 22, 52, 62 and network interface 42, 54, 68 through a system bus, mother board, or using any other suitable structure known in the art.

The network interfaces 42, 54, 68 of the host device 12, receiving device 14, and predetermined server 18 may each be communicatively coupled to one or more other host devices 12, receiving devices 14, and predetermined servers 18 via a network 44. The network 44 may be an open network, such as the Internet, a private network, such as a virtual private network, or any other suitable network. Each of the network interface 42, 54, 68 may be configured to transmit and/or receive data structures 24.

As will be understood by one of ordinary skill in the art, each of the network interfaces 42, 54, 68 may comprise a wireless network adaptor, an Ethernet network card, or any suitable device for performing network based communication between devices. Each of the network interface 42, 54, 68 may be communicatively coupled to the respective computer readable medium 22, 52, 62 such that each network interface 42, 54, 68 is able to send data stored on the respective computer readable medium 22, 52, 62 across the network 44 and store received data on the respective computer readable medium 22, 52, 62. Each of the network interface 42, 54, 68 may also be communicatively coupled to the respective processor 20, 50, 60 such that the processor is able to control operation of the network interface 42, 54, 68. The respective network interfaces 42, 54, 68, computer readable medium 22, 52, 62, and processors 20, 50, 60 may be communicatively coupled through a system bus, mother board, or using any other suitable manner as will be understood by one of ordinary skill in the art.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A method for securing electronic data, the method comprising:

embedding an executable program and embedded data to be secured in a data structure such that the embedded data is not accessible without first executing the executable program, wherein the data structure is stored in a non-transitory computer readable medium of a host device;

determining if a receiving device has permission to access the embedded data at a specific location specified by a global positioning system device;

if the receiving device is determined not to have the permission to access the embedded data, destroying at least a portion of the embedded data in the data structure by overwriting at least the portion of the embedded data in the data structure with zeros and then overwriting at least the portion of the embedded data in the data structure with random values;

if the receiving device is determined to have the permission to access the embedded data, allowing the receiving device to access the embedded data;

transmitting the data structure to the receiving device outside of a predefined area; and during transmission of the data structure:

receiving the data structure on a network using a network switch;

detecting, using the network switch, an identifier of the data structure;

determining the permission associated with the identifier;

when the permission associated with the identifier indicates that the data structure is permitted to be transmitted to the receiving device, transmitting the data structure from the network switch to the receiving device; and when the permission associated with the identifier indicates that the data structure is not permitted to be transmitted to the receiving device, destroying, by the network switch, at least the portion of the embedded data by overwriting at least the portion of the embedded data.

2. The method of claim 1, wherein the data structure contains financial data.

3. The method of claim 1, wherein the data structure contains healthcare data.

4. The method of claim 1, wherein the permission is determined by comparing the receiving device to a whitelist.

5. The method of claim 1, wherein the permission is determined by comparing the receiving device to a blacklist.

6. The method of claim 1, wherein the permission is determined by comparing the specific location of the receiving device to a blacklist of geographic locations.

7. The method of claim 1, wherein the permission is determined by comparing the specific location of the receiving device to a whitelist of geographic locations.

8. The method of claim 1, wherein the network switch sets a flag of the data structure.

9. The method of claim 8, wherein the network switch destroys the embedded data by setting the flag of the data structure to an armed state.

10. The method of claim 1 further comprising adding the receiving device to a blacklist when the permission associated with the identifier indicates that the data structure is not permitted to be transmitted to the receiving device.

11. A method for securing electronic data, the method comprising:
  embedding an executable program and embedded data to be secured in a data structure such that the embedded data is not accessible without first executing the executable program, wherein the data structure is stored in a non-transitory computer readable medium of a host device;
  determining if a receiving device has permission to access the embedded data at a specific location specified by a global positioning system device;
  if the receiving device is determined not to have the permission to access the embedded data, destroying at least a portion of the embedded data in the data structure by overwriting at least the portion of the embedded data in the data structure with zeros and then overwriting at least the portion of the embedded data in the data structure with random values;
  if the receiving device is determined to have the permission to access the embedded data, allowing the receiving device to access the embedded data;
  transmitting the data structure to the receiving device outside of a predefined area; and
  during transmission of the data structure:
    receiving the data structure on a network using a network router;
    detecting, using the network router, an identifier of the data structure;
    determining the permission associated with the identifier;
    when the permission associated with the identifier indicates that the data structure is permitted to be transmitted from the network router to the receiving device; and
    when the permission associated with the identifier indicates that the data structure is not permitted to be transmitted to the receiving device, destroying, by the network router, at least the portion of the embedded data by overwriting at least the portion of the embedded data.

12. The method of claim 11 further comprising adding the receiving device to a blacklist when the permission associated with the identifier indicates that the data structure is not permitted to be transmitted to the receiving device.

13. The method of claim 11, wherein the network router sets a flag of the data structure.

14. The method of claim 13, wherein the network router destroys the embedded data by setting the flag of the data structure to an armed state.

15. The method of claim 11, wherein the permission is determined by comparing the specific location of the receiving device to a blacklist of geographic locations.

16. A method for securing electronic data, the method comprising:
  embedding an executable program and embedded data to be secured in a data structure such that the embedded data is not accessible without first executing the executable program, wherein the data structure is stored in a non-transitory computer readable medium of a host device;
  determining if a receiving device has permission to access the embedded data at a specific location specified by a global positioning system device;
  if the receiving device is determined not to have the permission to access the embedded data, destroying at least a portion of the embedded data in the data structure by overwriting at least the portion of the embedded data in the data structure with zeros and then overwriting at least the portion of the embedded data in the data structure with random values;
  if the receiving device is determined to have the permission to access the embedded data, allowing the receiving device to access the embedded data;
  transmitting the data structure to the receiving device outside of a predefined area; and
  during transmission of the data structure:
    receiving the data structure on a network using a network sniffer;
    detecting, using the network sniffer, an identifier of the data structure;
    determining the permission associated with the identifier;
    when the permission associated with the identifier indicates that the data structure is permitted to be transmitted to the receiving device, transmitting the data structure from the network sniffer to the receiving device; and
    when the permission associated with the identifier indicates that the data structure is not permitted to be transmitted to the receiving device, destroying, by the network sniffer, at least the portion of the embedded data by overwriting at least the portion of the embedded data.

17. The method of claim 16 further comprising adding the receiving device to a blacklist when the permission associated with the identifier indicates that the data structure is not permitted to be transmitted to the receiving device.

18. The method of claim 16, wherein the data structure contains financial data.

19. The method of claim 16, wherein the permission is determined by comparing the receiving device to a whitelist.

20. The method of claim 16, wherein the permission is determined by comparing the receiving device to a blacklist.

* * * * *